US008789091B2

(12) United States Patent
Eldering et al.

(10) Patent No.: US 8,789,091 B2
(45) Date of Patent: Jul. 22, 2014

(54) QUEUE BASED ADVERTISEMENT SCHEDULING AND SALES

(75) Inventors: Charles A. Eldering, Doylestown, PA (US); Gregory C. Flickinger, Furlong, PA (US); John A. Schlack, Southampton, PA (US); John P. Blasko, New Hope, PA (US)

(73) Assignee: Prime Research Alliance E., Inc. (VG)

( * ) Notice: Subject to any disclaimer, the term of this patent is extended or adjusted under 35 U.S.C. 154(b) by 0 days.

(21) Appl. No.: 13/438,458

(22) Filed: Apr. 3, 2012

(65) Prior Publication Data

US 2012/0192224 A1    Jul. 26, 2012

Related U.S. Application Data

(63) Continuation of application No. 09/712,790, filed on Nov. 14, 2000, now Pat. No. 8,151,295.

(60) Provisional application No. 60/229,156, filed on Aug. 31, 200.

(51) Int. Cl.
*H04N 5/445*    (2011.01)
*G06F 3/00*    (2006.01)
*H04N 7/173*    (2011.01)

(52) U.S. Cl.
USPC ............................ 725/34; 725/35; 725/105

(58) Field of Classification Search
USPC .................... 725/34, 35, 36, 32, 134, 105
See application file for complete search history.

(56) References Cited

U.S. PATENT DOCUMENTS

| 4,602,279 A | 7/1986 | Freeman |
| 4,630,108 A | 12/1986 | Gomersall |
| 4,930,011 A | 5/1990 | Kiewit |
| 5,029,014 A | 7/1991 | Lindstrom |
| 5,031,213 A | 7/1991 | Kawasaki |
| 5,099,319 A | 3/1992 | Esch |
| 5,155,591 A | 10/1992 | Wachob |
| 5,165,069 A | 11/1992 | Vitt |
| 5,201,010 A | 4/1993 | Deaton |
| 5,231,494 A | 7/1993 | Wachob |
| 5,271,626 A | 12/1993 | Llenas |

(Continued)

FOREIGN PATENT DOCUMENTS

| CA | 2164608 | 12/1994 |
| CA | 2264392 | 1/1999 |

(Continued)

OTHER PUBLICATIONS

Claria Website-5 PGS.

(Continued)

*Primary Examiner* — James R Sheleheda
(74) *Attorney, Agent, or Firm* — The Belles Group, P.C.

(57) ABSTRACT

In accordance with the invention, advertisement identifiers are stored in a queue in memory in the set top box or elsewhere corresponding to individual subscribers of a television service delivery network. The advertisements are retrieved and displayed in the order dictated by the queue as advertisement avails are detected in the particular channel information stream being watched by that subscriber. Accordingly, the subscriber sees the advertisements regardless of what channel or television program is being watched and sees them in the order dictated by the queue. The invention also is applicable to other information streams including Internet advertising, audio/radio advertising and advertising in electronic program guides.

4 Claims, 6 Drawing Sheets

(56) References Cited

U.S. PATENT DOCUMENTS

| | | | |
|---|---|---|---|
| 5,305,464 | A | 4/1994 | Frett |
| 5,319,455 | A | 6/1994 | Hoarty |
| 5,351,075 | A | 9/1994 | Herz |
| 5,400,166 | A | 3/1995 | Huber |
| 5,410,344 | A | 4/1995 | Graves |
| 5,424,770 | A | 6/1995 | Schmelzer |
| 5,425,100 | A | 6/1995 | Thomas |
| 5,446,919 | A | 8/1995 | Wilkins |
| 5,457,562 | A | 10/1995 | Tremblay |
| 5,515,098 | A | 5/1996 | Carles |
| 5,532,732 | A | 7/1996 | Yuen |
| 5,534,911 | A | 7/1996 | Levitan |
| 5,550,578 | A | 8/1996 | Hoarty et al. |
| 5,559,549 | A | 9/1996 | Hendricks |
| 5,565,909 | A | 10/1996 | Thibadeau |
| 5,574,860 | A | 11/1996 | Perlman |
| 5,579,055 | A | 11/1996 | Hamilton |
| 5,592,551 | A | 1/1997 | Lett |
| 5,600,364 | A | 2/1997 | Hendricks |
| 5,600,366 | A | 2/1997 | Schulman |
| 5,600,573 | A | 2/1997 | Hendricks |
| 5,604,542 | A | 2/1997 | Dedrick |
| 5,612,742 | A | 3/1997 | Krause |
| 5,621,728 | A | 4/1997 | Lightfoot |
| 5,621,812 | A | 4/1997 | Deaton |
| 5,635,978 | A | 6/1997 | Alten |
| 5,636,346 | A | 6/1997 | Saxe |
| 5,644,723 | A | 7/1997 | Deaton |
| 5,649,114 | A | 7/1997 | Deaton |
| 5,650,994 | A | 7/1997 | Daley |
| 5,652,615 | A | 7/1997 | Bryant |
| 5,657,072 | A | 8/1997 | Aristides |
| 5,659,367 | A | 8/1997 | Yuen |
| 5,661,516 | A | 8/1997 | Carles |
| 5,687,095 | A | 11/1997 | Haskell |
| 5,694,176 | A | 12/1997 | Bruette |
| 5,708,664 | A | 1/1998 | Budge |
| 5,724,091 | A | 3/1998 | Freeman |
| 5,724,521 | A | 3/1998 | Dedrick |
| 5,740,549 | A | 4/1998 | Reilly |
| 5,752,160 | A | 5/1998 | Dunn |
| 5,752,238 | A | 5/1998 | Dedrick |
| 5,754,938 | A | 5/1998 | Herz |
| 5,754,939 | A | 5/1998 | Herz |
| 5,758,257 | A | 5/1998 | Herz |
| 5,758,328 | A | 5/1998 | Giovannoli |
| 5,761,601 | A | 6/1998 | Nemirofsky |
| 5,774,170 | A | 6/1998 | Hite |
| 5,781,226 | A | 7/1998 | Sheehan |
| 5,784,523 | A | 7/1998 | Quan et al. |
| 5,790,426 | A | 8/1998 | Robinson |
| 5,790,935 | A | 8/1998 | Payton |
| 5,801,747 | A | 9/1998 | Bedard |
| 5,801,753 | A | 9/1998 | Eyer |
| 5,805,974 | A | 9/1998 | Hite |
| 5,808,694 | A | 9/1998 | Usui |
| 5,812,790 | A | 9/1998 | Randall |
| 5,815,671 | A | 9/1998 | Morrison |
| 5,848,352 | A | 12/1998 | Dougherty |
| 5,861,919 | A | 1/1999 | Perkins |
| 5,862,140 | A | 1/1999 | Shen |
| 5,864,823 | A | 1/1999 | Levitan |
| 5,877,812 | A | 3/1999 | Krause |
| 5,886,731 | A | 3/1999 | Ebisawa |
| 5,912,696 | A | 6/1999 | Buehl |
| 5,917,830 | A | 6/1999 | Chen |
| 5,918,014 | A | 6/1999 | Robinson |
| 5,926,205 | A | 7/1999 | Krause |
| 5,931,901 | A | 8/1999 | Wolfe |
| 5,948,061 | A | 9/1999 | Merriman |
| 5,956,088 | A | 9/1999 | Shen |
| 5,959,688 | A | 9/1999 | Schein |
| 5,966,120 | A | 10/1999 | Arazi |
| 5,969,715 | A | 10/1999 | Dougherty |
| 5,978,381 | A | 11/1999 | Perlman |
| 5,990,927 | A | 11/1999 | Hendricks |
| 6,002,393 | A | 12/1999 | Hite |
| 6,002,394 | A | 12/1999 | Schein |
| 6,006,257 | A | 12/1999 | Slezak |
| 6,009,409 | A | 12/1999 | Adler |
| 6,009,410 | A | 12/1999 | LeMole |
| 6,020,880 | A | 2/2000 | Naimpally |
| 6,020,883 | A | 2/2000 | Herz |
| 6,026,368 | A | 2/2000 | Brown |
| 6,026,369 | A | 2/2000 | Capek |
| 6,029,045 | A | 2/2000 | Picco |
| 6,029,195 | A | 2/2000 | Herz |
| 6,038,256 | A | 3/2000 | Linzer |
| 6,055,510 | A | 4/2000 | Henrick |
| 6,055,573 | A | 4/2000 | Gardenswartz |
| 6,061,097 | A | 5/2000 | Satterfield |
| 6,088,722 | A | 7/2000 | Herz |
| 6,119,098 | A * | 9/2000 | Guyot et al. ............... 705/14.61 |
| 6,130,726 | A | 10/2000 | Darbee |
| 6,141,010 | A | 10/2000 | Hoyle |
| 6,141,358 | A | 10/2000 | Hurst, Jr. |
| 6,144,653 | A | 11/2000 | Persson |
| 6,160,570 | A | 12/2000 | Sitnik |
| 6,160,989 | A | 12/2000 | Hendricks |
| 6,177,931 | B1 | 1/2001 | Alexander |
| 6,181,334 | B1 | 1/2001 | Freeman |
| 6,208,688 | B1 | 3/2001 | Seo |
| 6,240,103 | B1 | 5/2001 | Schoenblum |
| 6,252,634 | B1 | 6/2001 | Yuen |
| 6,253,238 | B1 | 6/2001 | Lauder |
| 6,263,501 | B1 | 7/2001 | Schein |
| 6,292,786 | B1 | 9/2001 | Deaton |
| 6,334,108 | B1 | 12/2001 | Deaton |
| 6,357,042 | B2 | 3/2002 | Srinivasan |
| 6,359,902 | B1 | 3/2002 | Putzolu |
| 6,370,199 | B1 | 4/2002 | Bock |
| 6,378,130 | B1 | 4/2002 | Adams |
| 6,418,122 | B1 | 7/2002 | Schoenblum |
| 6,424,998 | B2 | 7/2002 | Hunter |
| 6,425,131 | B2 | 7/2002 | Crandall |
| 6,434,747 | B1 | 8/2002 | Khoo |
| 6,446,082 | B1 | 9/2002 | Arita |
| 6,446,261 | B1 | 9/2002 | Rosser |
| 6,456,234 | B1 | 9/2002 | Johnson |
| 6,459,427 | B1 | 10/2002 | Mao |
| 6,463,585 | B1 | 10/2002 | Hendricks et al. |
| 6,477,579 | B1 * | 11/2002 | Kunkel et al. ................. 709/229 |
| 6,484,317 | B1 | 11/2002 | Wright |
| 6,487,721 | B1 | 11/2002 | Safadi |
| 6,493,875 | B1 | 12/2002 | Eames |
| 6,505,169 | B1 | 1/2003 | Bhagavath |
| 6,516,002 | B1 | 2/2003 | Huang |
| 6,516,302 | B1 | 2/2003 | Deaton |
| 6,571,279 | B1 | 5/2003 | Herz |
| 6,577,716 | B1 * | 6/2003 | Minter et al. ............ 379/101.01 |
| 6,583,825 | B1 | 6/2003 | Yuen et al. |
| 6,611,624 | B1 | 8/2003 | Zhang |
| 6,615,039 | B1 | 9/2003 | Eldering |
| 6,631,523 | B1 | 10/2003 | Matthews, III |
| 6,637,029 | B1 | 10/2003 | Maissel et al. |
| 6,665,872 | B1 | 12/2003 | Krishnamurthy |
| 6,675,385 | B1 | 1/2004 | Wang |
| 6,684,194 | B1 | 1/2004 | Eldering |
| 6,698,020 | B1 | 2/2004 | Zigmond |
| 6,701,355 | B1 * | 3/2004 | Brandt et al. ................. 709/219 |
| 6,704,930 | B1 | 3/2004 | Eldering |
| 6,718,551 | B1 | 4/2004 | Swix |
| 6,724,974 | B2 | 4/2004 | Naruto |
| 6,738,978 | B1 | 5/2004 | Hendricks |
| 6,760,916 | B2 | 7/2004 | Holtz et al. |
| 6,796,555 | B1 | 9/2004 | Blahut |
| 6,820,062 | B1 | 11/2004 | Gupta |
| 6,820,277 | B1 | 11/2004 | Eldering |
| 7,003,792 | B1 | 2/2006 | Yuen |
| 7,146,627 | B1 | 12/2006 | Ismail et al. |
| 7,150,030 | B1 | 12/2006 | Eldering |
| 7,185,353 | B2 | 2/2007 | Schlack |
| 7,222,354 | B1 | 5/2007 | Ching et al. |
| 7,411,631 | B1 * | 8/2008 | Joshi et al. .................... 348/734 |

(56) References Cited

U.S. PATENT DOCUMENTS

| | | |
|---|---|---|
| 7,584,490 B1 | 9/2009 | Schlack |
| 8,151,295 B1 * | 4/2012 | Eldering et al. ............... 725/34 |
| 2001/0011844 A1 * | 8/2001 | Ernst et al. ..................... 307/64 |
| 2001/0013124 A1 | 8/2001 | Klosterman |
| 2001/0014975 A1 | 8/2001 | Gordon et al. |
| 2001/0023436 A1 * | 9/2001 | Srinivasan et al. ............ 709/219 |
| 2001/0025377 A1 | 9/2001 | Hinderks |
| 2001/0049820 A1 | 12/2001 | Barton |
| 2002/0026645 A1 | 2/2002 | Son |
| 2002/0038455 A1 | 3/2002 | Srinivasan |
| 2002/0083439 A1 | 6/2002 | Eldering |
| 2002/0083442 A1 | 6/2002 | Eldering |
| 2002/0083443 A1 | 6/2002 | Eldering |
| 2002/0087975 A1 | 7/2002 | Schlack |
| 2002/0087976 A1 | 7/2002 | Kaplan |
| 2002/0104083 A1 | 8/2002 | Hendricks et al. |
| 2002/0152471 A1 | 10/2002 | De Haas |
| 2002/0188943 A1 | 12/2002 | Freeman |
| 2002/0194589 A1 | 12/2002 | Cristofalo et al. |
| 2003/0088872 A1 | 5/2003 | Maissel |
| 2003/0093792 A1 | 5/2003 | Labeeb |
| 2003/0135853 A1 | 7/2003 | Goldman |
| 2003/0200128 A1 | 10/2003 | Doherty |
| 2004/0163101 A1 | 8/2004 | Swix et al. |

FOREIGN PATENT DOCUMENTS

| | | |
|---|---|---|
| CA | 2151458 | 2/2004 |
| EP | 1220542 | 7/2002 |
| WO | WO9712486 | 4/1997 |
| WO | WO9717774 | 5/1997 |
| WO | WO9827723 | 6/1998 |
| WO | WO9856128 | 12/1998 |
| WO | WO9901984 | 1/1999 |
| WO | WO9904561 | 1/1999 |
| WO | WO9911065 | 3/1999 |
| WO | WO9926415 | 5/1999 |
| WO | WO9952285 | 10/1999 |
| WO | WO9955066 | 10/1999 |
| WO | WO9960789 | 11/1999 |
| WO | WO9965237 | 12/1999 |
| WO | WO9966719 | 12/1999 |
| WO | WO0005888 | 2/2000 |
| WO | WO0014951 | 6/2000 |
| WO | WO0033224 | 6/2000 |
| WO | WO0033233 | 6/2000 |
| WO | WO0054504 | 9/2000 |
| WO | WO0064166 | 10/2000 |
| WO | WO0069163 | 11/2000 |
| WO | WO0147279 | 6/2001 |
| WO | WO0049801 | 10/2001 |
| WO | WO0233973 | 4/2002 |
| WO | WO0233975 | 4/2002 |

OTHER PUBLICATIONS

NCTA Technical Papers "Compressed Digital Commercial Insertion: New Technology Architectures for the Cable Advertising Business" 1992 8 pages.

AdLink Engineering, Ad insertion wiring diagrams, 1999, 17 pages.

U.S. Appl. No. 09/635,539, Eldering, Charles A., Aug. 10, 2000.

U.S. Appl. No. 09/635,542, Eldering, Charles A., Aug. 10, 2000.

* cited by examiner

| FORD (ARL$_1$) |
|---|
| ARL $_2$ |
| ARL $_3$ |
| ARL $_4$ |
| ARL $_5$ |
| FORD (ARL$_6$) |
| ARL $_7$ |
| ARL $_8$ |
| ARL $_9$ |
| ARL $_{10}$ |
| FORD (ARL$_{11}$) |

*FIG. 5A*

| FORD $_1$ (ARL$_1$) |
|---|
| ARL $_2$ |
| ARL $_3$ |
| ARL $_4$ |
| ARL $_5$ |
| FORD $_2$ (ARL$_6$) |
| ARL $_7$ |
| ARL $_8$ |
| ARL $_9$ |
| ARL$_{10}$ |
| FORD $_3$ (ARL$_{11}$) |

*FIG. 5B*

QUEUE BASED ADVERTISEMENT SCHEDULING AND SALES

CROSS REFERENCE TO RELATED APPLICATION

This application is a continuation of U.S. patent application Ser. No. 09/712,790 (now U.S. Pat. No. 8,151,295), filed on Nov. 14, 2000, entitled Queue Based Advertisement Scheduling and Sales, which claims the benefit of U.S. Provisional Application No. 60/229,156 filed on Aug. 31, 2000, entitled Method and System for Addressable and Program Independent Advertising, the entire disclosures of which are incorporated herein by reference.

FIELD OF THE INVENTION

The invention pertains to advertising. More particularly, the invention pertains to targeted advertising, such as in television programming delivery systems utilizing set top boxes, memory enabled set top boxes, and/or personal video recorders, for each subscriber.

BACKGROUND OF THE INVENTION

The traditional paradigm for delivering advertisements in the stream of television programming is herein termed linked advertising. Whether the television programming service is being provided by antenna broadcast, analog cable, digital broadcast satellite (DBS), digital cable, switched digital video (SDV) or any other means, generally all viewers of a particular program will see the same ads in the same order at the same times. In essence, each advertisement is "linked" to a particular point within a particular program. If any particular viewer is not viewing the particular program at the particular time, he or she will not see the advertisement. That is, in linked advertising, the advertisements are simply part of the data stream from the head end, i.e., from the central office of the television service provider to all subscribers of that service.

However, with modern digital television service methods, including SDV systems (in which television service is received over the telephone lines) via very high speed digital subscriber line (VDSL) and digital cable, both of which utilize the concept of addressable set top boxes (STBs), more personalized service is now available. For instance, in both types of systems, two-way communication between the subscribers set top box and the service provider via the network is possible. Further, the service provider can send different data to different subscribers. In telephone based systems such as SDV, the service provider can actually send different information to any individual subscriber.

In fact, in one embodiment, the VDSL television delivery standard essentially is an access network utilizing asynchronous transfer mode (ATM) protocol. In digital cable systems, different data can be sent to different groups of customers.

Accordingly, it is an object of the present invention to provide an improved method and apparatus for delivering advertising via a network, such as a television service network.

It is another object of the present invention to provide a method and apparatus by which targeted advertisements can be inserted into the television program stream in a targeted fashion either by individual subscriber or group of subscribers on a network.

It is a further object of the present invention to provide a method and apparatus for providing targeted advertisements to individual subscribers or groups of subscribers on a network.

SUMMARY OF THE INVENTION

In accordance with the invention, one or more queues of advertisement resource locators (ARLs) are maintained for each subscriber on a communications network, such as a cable television network, preferably in a memory of the subscribers' set top boxes. In a preferred embodiment of the invention, the actual advertisements corresponding to the advertisement identifiers also are stored in the memory in the individual set top boxes. Each advertisement identifier comprises, at a minimum, information indicating where the advertisement may be found on the network or on a local memory.

In a preferred embodiment, when an advertising opportunity is detected or otherwise determined in the data stream, e.g., a commercial break in a television program, the advertisement corresponding to the ARL at the top of the queue is retrieved and inserted into the program stream at the individual addressable node of the network, e.g., the set top box. This break may occur before the programming starts, during the programming, or afterwards. Thus, the insertion of the advertisement is independent of the programming being watched. Unlike prior art where the advertisement is "linked" to a particular point within a particular program, in the present invention, the advertisements are linked to the subscribers by forming the queue of address locators of different advertisements and wherein the targeted advertisement is inserted by detecting a commercial break in any programming being watched by the subscriber. Thus, insertion of advertisements is independent of programming being watched and the subscriber will receive the designated advertisement in the designated order as opportunities occur regardless of the channel program or time of day.

In accordance with the invention, the television service provider sells places in the individual (or grouped) queues to advertisers based on available information about the subscribers. Such information may include publicly available demographic and psychographic information, as well as more individualized information which may be obtained through questionnaires filled out by subscribers.

While the invention is particularly suitable for inserting targeted advertisements into television programming, the invention is readily adaptable to inserting any particular data into any particular stream of other data transmitted via a communications system.

Such systems can include targeted advertising in Electronic Program Guides or digital overlay/insertion systems.

These and other features and objects of the invention will be more fully understood from the following detailed description of the preferred embodiments which should be read in light of the accompanying drawings.

BRIEF DESCRIPTION OF THE DRAWINGS

The accompanying drawings, which are incorporated in and form a part of the specification, illustrate the embodiments of the present invention and, together with the description serve to explain the principles of the invention.

In the drawings:

FIGS. 5A and 5B comprise logic diagrams illustrating other advertisement identifier queue organizations in accordance with the present invention.

DETAILED DESCRIPTION OF THE PREFERRED EMBODIMENT

Figure 1:
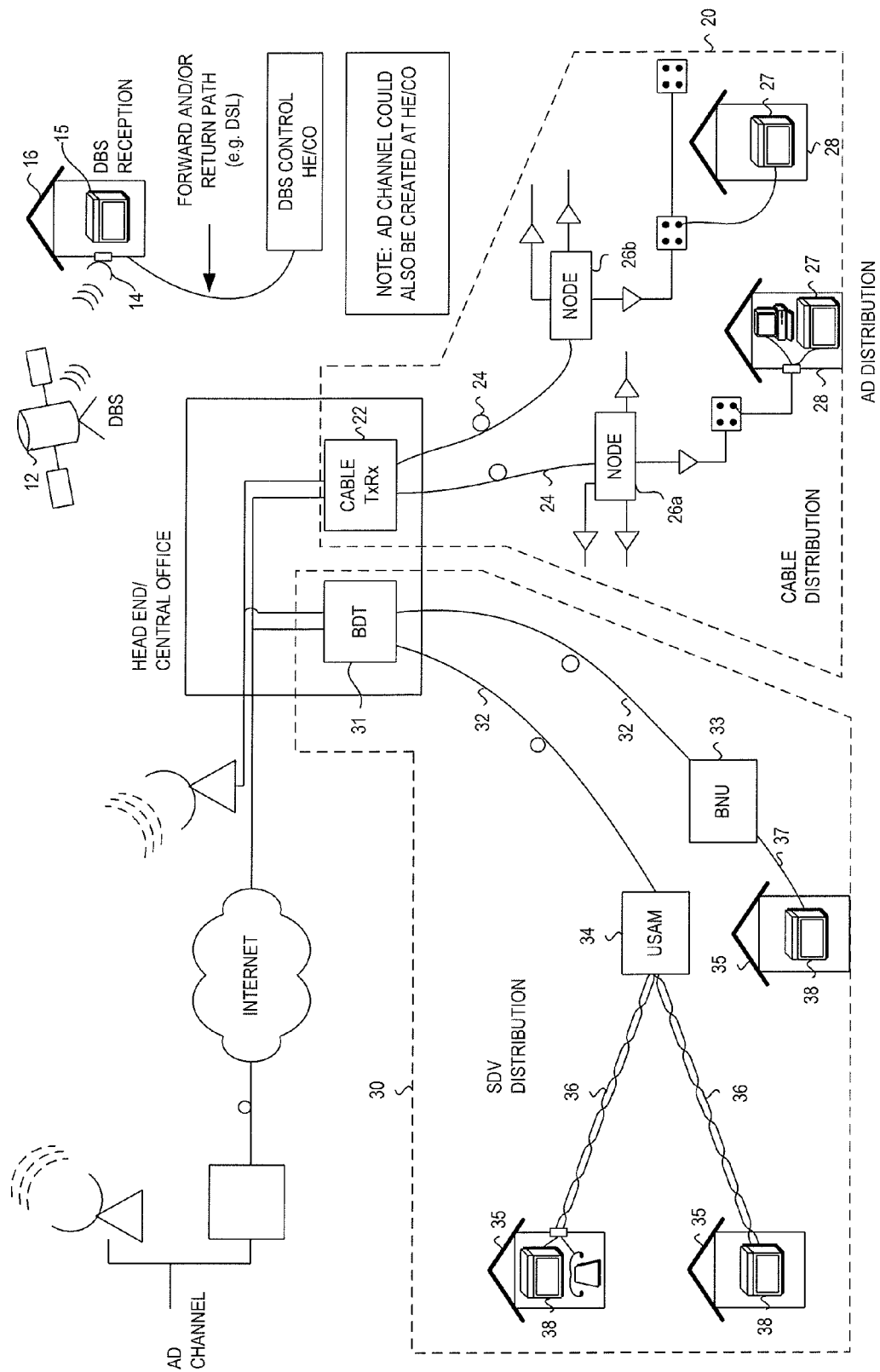
FIG. 1 is a block diagram of an exemplary television service communication network.

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

With reference to the drawings, in general, and FIGS. 1 through 6 in particular, the apparatus of the present invention is disclosed.

FIG. 1 generally illustrates three of the most common types of digital television service delivery networks with which the present invention can be suitably used. These include (1) VDSL, (2) digital cable and (3) digital broadcast satellite (DBS). In a digital broadcast satellite system, a programming stream comprising upwards of a hundred channels of television programming is delivered directly from a geo-stationary satellite transmitter 12 orbiting the earth to a receiving antenna 14 mounted on or near each subscriber's house and from the antenna via a cable to a satellite receiving station 15 in the subscriber's house 16. The satellite receiving station 15 (which is a form of set top box) selects a channel and demodulates the signal for delivery to a monitor (e.g., a television, not shown). Most DBS systems are arranged such that data also can be sent in the upstream direction, that is, from the set top box 15 to the DBS provider. In most DBS systems, the set top box also is coupled to the telephone line and is designed and programmed to place telephone calls to the DBS service provider to periodically send information in the upstream direction. Such information commonly may comprise requests for Pay-Per-View programs, requests for changes in the subscription (a request that one or more of premium channels be added to the service, etc.).

In a typical digital cable network 20, multiple channels of television information are transmitted from a head end or central office 22 via a cable network. Particularly, the channels are transmitted via cables 24 to nodes 26. The nodes are essentially switching/routing stations which service multiple homes (usually a few hundred). The nodes 26 route the signals to individual subscribers 28. The individual subscriber will have set top boxes 27 that select a particular channel from the transmit stream, demodulate it and forward it for display on one or more monitors or televisions (not shown). Different data streams can be sent to the different nodes 26 of the network such that households coupled to node 26a can receive different programming than households coupled to node 26b. Thus, such systems are "addressable" by node, but not by individual subscriber. Upstream information may be sent from the set top box to the central office via a dedicated upstream channel over the cable. In cable systems that do not support two-way communication, the upstream "channel" can be through the telephone as described above in connection with DBS systems.

In accordance with a third common type of system, namely, SDV 30, television programming is transmitted over the regular telephone network. Particularly, television signals are transmitted from a central office 31 via wire, typically fiber optic cable 32, to a universal service access multiplexer (USAM) 34 which then delivers the data to multiple individual subscriber households 35 via regular telephone twisted wire pair 36 using VDSL modems and protocols. The USAM 34 receives a wide bandwidth signal comprising some or all of the television channels. However, because of the bandwidth limitations of twisted pair wire, typically only about one channel of television programming at a time can be delivered from the USAM to the household. Accordingly, the subscriber has a set top box 38 that is similar in functionality to the set top box of a digital cable system or DBS system, except that when the user changes channels such as by operating a remote control, the remote channel change signal is received by the STB and transmitted to the USAM 34 which switches the channel for the user and begins sending the newly selected channel to the household. SDV systems are essentially fully modern asynchronous two-way communication networks. Accordingly, the set top box can transmit information upstream via the same VDSL modem that receives the downstream signals. SDV systems typically operate using an asynchronous transfer mode (ATM) protocol which is well-known in the networking arts. In an alternative embodiment, the signals are transmitted from the central office 31 to a broadband network unit (BNU) 33. The BNU 33 delivers the data to individual households 35 using coaxial cable 37.

Figure 2:
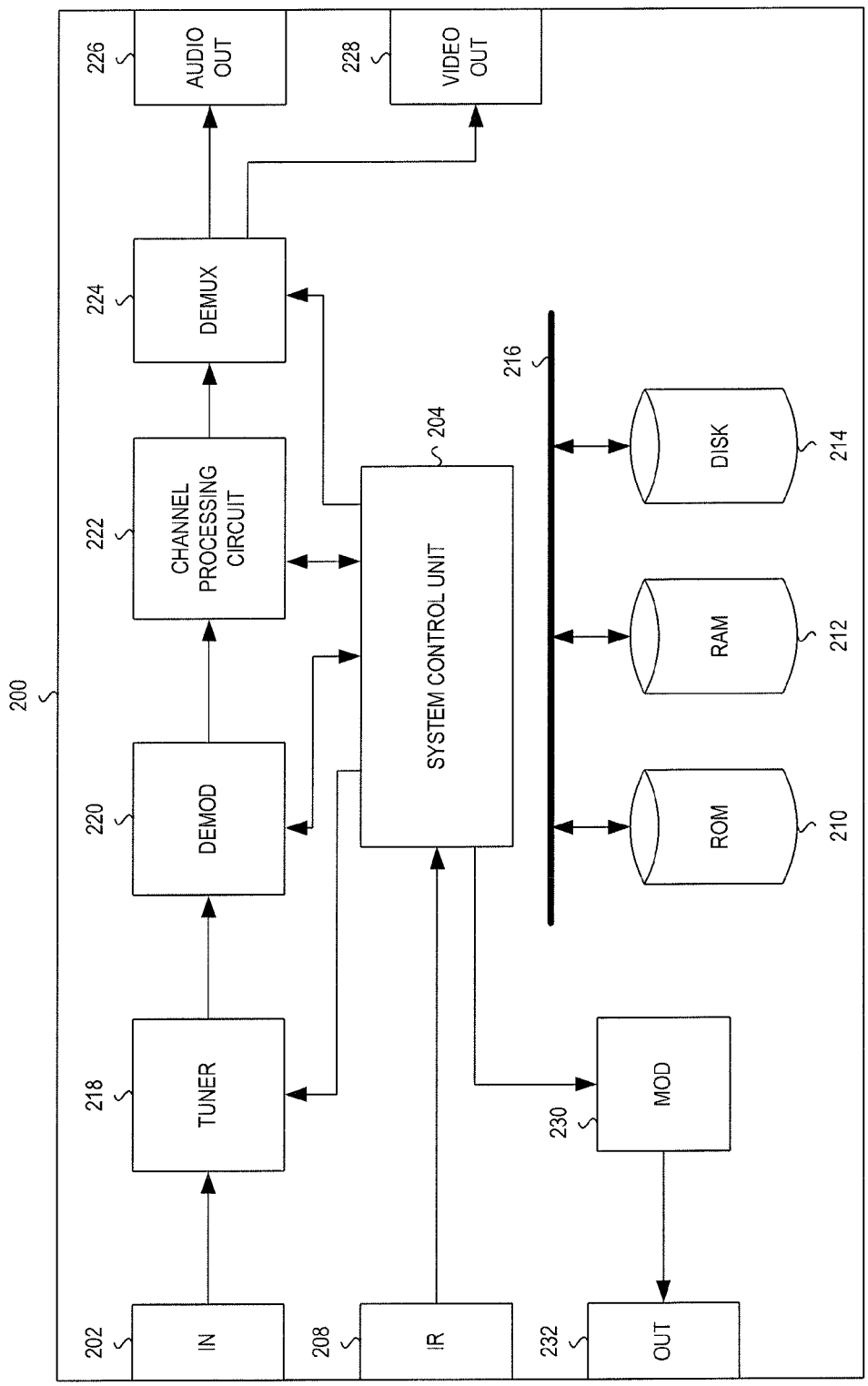
FIG. 2 is a block diagram of an exemplary set top box of FIG. 1.

FIG. 2 is a block diagram showing the basic components of a set top box 200 within which the present invention may be incorporated, whether it is for DBS, SDV, digital cable or any other system. The set top box 200 includes an input port 202 for coupling to the input signal, e.g., a coaxial cable in the case of analog or digital cable TV, the telephone line in the case of SDV or an input cable from an antenna in the case of DBS. The television input signal may be analog or digital. Alternatively, the signal may be a video stream or multimedia stream such as a motion picture expert group (MPEG) signal from any communications network, such as the Internet. The set top box includes a system control unit 204 which controls operation of the components of the STB. The system control unit essentially is a central processing unit (CPU) and may be any digital processing device, such as a microprocessor, finite state machine (FSM), digital signal processor (DSP), application specific integrated circuit (ASIC), general purpose computer, etc. The system control unit 204 receives commands from the subscriber, such as through infrared (IR) reception of commands from a handheld remote control unit (not shown) through an IR receiving circuit 208, decodes the commands and forwards control signals to other circuits in the set top box 200 in order to carry out the subscriber's commands, such as changing the channel. The STB further includes a read only memory (ROM) 210 containing software and fixed data used for operating the STB, and a random access memory (RAM) 212 for storing changeable data, such as the queues and advertisements in accordance with the present invention. Preferably, the STB also includes a separate internal or external large memory device, such as a hard disk drive 214 or optical disk drive for storing the very large amounts of data that comprise digital multimedia data, e.g., television programs and advertisements. The SCU 204, RAM 212, ROM 210 and hard disk 214 are coupled to a master bus 216 over which the units can communicate with each other.

The input signal from input port 202 is passed through a tuning circuit 218. Under control of the system control unit 204, the tuning circuit selectively parses out the data corresponding to the particular channel selected by the viewer. That data is passed to a demodulator 220 that demodulates the data. A channel processing circuit 222 takes the demodulated channel data and processes it as needed. The necessary channel processing may comprise almost nothing to significant processing of the data depending on the particular form of the input data and the features of the STB which would be familiar to persons of skill in the related arts. Exemplary functions that might be performed in the channel processing circuitry include decoding an encoded data stream (e.g., MPEG, Dolby SurroundSound□) or inserting advertisements into the data stream in accordance with the present invention.

If received data is to be stored locally at the STB, the channel processing circuit can pass the data to one of the memory devices 212 or 214 through the system control unit 204.

The output of the channel processing circuit typically is coupled to a demultiplexer 224 which separates the audio and video portions of the channel and forwards them to audio and video output ports 226 and 228, respectively.

At least tuner 218 and channel processing circuit 222 are controlled by the system control unit 204. However, the demodulator and demultiplexer may also need control.

Many STBs also can transmit data upstream to the head end. Such STBs would include a modulator 230 coupled to the system control unit for modulating data generated in the system control unit for transmission to the head end as well as a output port 232 for coupling a cable or other link to the head end. It will be understood by those of skill in the art that the input port 202 and output port 232 might comprise the same physical port.

A set top box for an SDV network typically would not include the tuner 218 since, as indicated above, channel selection is not processed in the set top box but is merely transmitted to the USAM for processing.

It also will be apparent to those of skill in the related arts that FIG. 2 is a very high level depiction of the most basic components of an STB and that other forms are possible.

The invention will now be described in connection with the particular embodiment in which it is used to insert advertisements into television programming. However, it should be understood by persons of skill in the art that the invention can be used to insert any data into any other data stream. For instance, the invention can be applied to the Internet, streaming audio data, etc. It also may be applied to insert advertisements in the electronic program guides that are frequently provided in one channel of television programming and which commonly include advertisements in a portion of the display. The system can also be utilized for the management of advertisements which are inserted directly into a portion of the screen during the actual programming, such as those advertisements which are electronically placed on the billboards in sports arenas or on the field. Such advertisement insertion technology is commercially available from companies such as Princeton Video Image, Inc., of Lawrenceville, N.J. Preferably, the information stream includes particular time intervals which are dedicated for insertion of such external data. However, the invention can be utilized to replace existing data in the data stream, if desired. In the nomenclature of the specification, such designated intervals are termed avails.

In accordance with a preferred embodiment of the invention, the various television programming channels include open commercial breaks designated specifically for the insertion of ads by the television service provider. That is, the normal stream of information in the channel includes blank intervals so that an advertisement from a source external to the channel data itself can be inserted into that interval. The avails also may be created when a program is recorded on a set top box with memory or a personal video recorder. In such instances, the consumer may agree to watch advertising prior to, during, or even after a recorded program is played back. The present invention can thus be used to manage advertisements in recorded video streams. The advertisement insertion can be performed as the programming is being recorded, as it is played back to the monitor or even between recording and playback by rearranging the content in memory to add the advertisements.

Also in accordance with the invention, there should be some means by which the set top box can determine the location and preferably the duration of avails. Several different means for performing this function are possible. For instance, PCT Patent Publication No. WO 99/66719, the disclosure of which is incorporated hereby by reference, discloses several means, such as detecting the black frames which television programmers typically provide in the video stream at the beginning of a television commercial avail. Alternatively, DVS-253 is a digital video standard for television promulgated by the Society of Cable and Television Engineers (SCTE) which provides for digital queue tones within the data stream indicating the start of commercial avails. In an analog television data stream, an avail indicator can be embedded within the vertical blanking interval which can be detected by the set top box. The indicator can include information indicating the duration of the avail.

Figure 3:
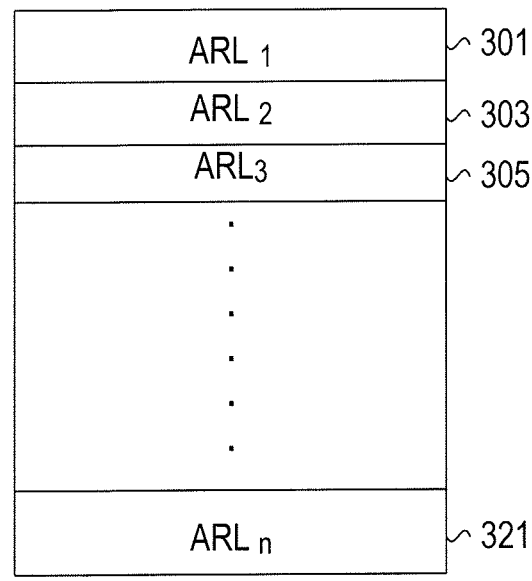
FIG. 3 is a logic diagram illustrating an advertisement identifier queue stored in memory in accordance with the present invention.

In accordance with a preferred embodiment of the invention, the CPU in the set top box maintains an advertisement queue in RAM memory. The queue is a stacked list of advertisement resource locators (ARLs) such as illustrated in FIG. 3. As illustrated in FIG. 3, each address locator may have its own address within the stacked list. FIG. 3, for exemplary purposes, illustrates a first address resource locator $ARL_1$ (301), a second address resource locator $ARL_2$ (303), a third address resource locator $ARL_3$ (305), and an nth address resource locator $ARL_n$ (321). At a minimum, the ARLs indicate the location of a particular advertisement on the network. Preferably, the ARLs also indicate other information about the advertisement, such as the duration of the advertisement.

The ads that are pointed to by the ARLs preferably are stored in a memory local to the set top box. The local memory for storing the advertisement may comprise any high volume memory, including, but not limited to, RAM, magnetic hard drive and optical storage media such as optical disks. Alternately, the ads can be stored on a remote server coupled to the communications network.

In accordance with the invention, the set top box (1) determines whether the box is turned on and, if so, to what particular channel it is tuned, (2) detects avails in that channel, and (3) inserts the advertisements identified by the ARLs in the queue in the order indicated in the queue into the avails as they arrive.

Thus, in accordance with the invention, advertisements are no longer linked to any particular advertisement spot in any particular program. In accordance with the invention, a virtual roadblock can be set up whereby the subscriber will receive the designated ads in the designated order as avails occur in whatever programming he or she is viewing, regardless of the channel, program or time of day. In this manner, advertisers can more specifically reach their target audience while also being given a much higher level of confidence that their ads have actually been viewed by the target audience.

With traditional linked advertising, the advertiser pays to have an advertisement displayed in a designated time slot in a designated channel regardless of who or how many viewers are tuned in the channel at that time. In accordance with the present invention, the advertisement is not played to any subscriber unless that subscriber's set top box is turned on. Further, the advertisement is played in the channel to which the set top box is tuned, thus virtually guaranteeing that the subscriber actually sees the advertisement that the advertiser has paid to have displayed.

Even further, the television service provider can address individual STBs or at least groups of STBs depending on the particular network and instruct them to insert particular ARLs in their queues. Accordingly, the television service provider can sell advertising space to advertisers in a much more targeted fashion than in the prior art.

The advertisement identifiers are transmitted to the individual set top boxes for storage in the queues from the central office of the television service provider in any reasonable manner. Preferably, the advertisements themselves are also transmitted to the STBs for storage until they are "played". Several manners are well known in connection with existing digital cable and VDSL systems for transmitting data to individual receiving nodes coupled to the network. For instance, VDSL systems essentially operate on an asynchronous transfer mode (ATM) protocol with video typically being carried as MPEG data. In digital cable and DBS systems, advertisements can be delivered in MPEG transport streams.

Numerous means are available for delivering ARLs to the set top boxes for placement in the queue as well as delivering the ads themselves for storage. Common to all of these architectures are multiple forward channels (head end transmitting to STBs) and one return channel (STB transmitting to the head end). One of the forward channels (hereinafter the advertisement channel) may be dedicated to delivering the advertisements, meta data about the advertisements, ARLs, and instructions for the STBs regarding how the ARLS are to be organized in the queues. The return path/channel is used for, among other things, communicating to the service provider what ads are stored at the STB, what ads have been played and when, what ads are scheduled for play, etc. Such information is critical for selling and charging the advertisers for playing the ads. The return path typically would be a low bandwidth channel since the amount of data transmitted upstream is very limited relative to the video and audio data which is transmitted in the downstream channels. Also, as previously noted, the return path need not be through the same network as the downstream path. For instance, as discussed above in connection with SDV or DBS, the return path can be through a modem via POTS (Plain Old Telephone Service).

In one exemplary embodiment, a service provider (DBS, cable, SDV, local multipoint distribution system) allocates and dedicates one or more channels of the system to be used for delivering nothing but advertisements and advertisement metadata, including ARLs. This channel could be a high band width (e.g., 6 MHZ) channel. This channel would be encoded and transported in the same manner as any other programming content channel on the system and would include all advertisements that are intended for display to any subscriber on the network.

The STBs could be pre-programmed with advertisement maps which indicate which types of advertisements they are to download from the advertisement channel and which they can ignore.

In one embodiment, each advertisement can have a tag associated with it (e.g., embedded within it or linked to it). This tag could be a simple identifier or a complete advertisement vector describing many characteristics of the advertisement. Such meta data could be transported with the advertisement or in advance of the ad.

Each STB contains in memory a map which tells the STB the particular advertising group or groups to which it belongs, the group or groups, of course depending on the demographic, psychographic or other information available to the cable service provider about the owner of the STB.

This tag or vector can be detected by the STB to determine whether or not to store the advertisement and when and how to display the advertisement. Such determination can be accomplished in a number of ways depending on the application. If the tag is a simple identifier (of the advertisement or the advertisement group to which it belongs) and is sent with the ad, the STB could examine the tag on the fly as the advertisement is received and either save it or ignore it based upon the instructions/rules preprogrammed into the STBs advertisement map.

The tags would indicate for which one (or more) of a plurality of advertising groups the advertisement is intended. The STBs pick out and store those ads that have a matching advertising group in the tag to the advertising group or groups in the STBs advertising group map.

The advertisement maps can be preprogrammed into the STB before it is delivered to the subscriber. However, more preferably, the maps are sent to the STBs via the network on a periodic basis, such as is done via a carousel mechanism. In one embodiment, each advertisement is assigned a unique identifier. Each advertisement also is assigned to one or more target groups (i.e., subscribers) for which it may be appropriate. The television service provider constructs a map which indicates, for each unique advertisement identifier, the target groups for which that advertisement is intended. The entire map can be sent to each STB so that each STB can utilize the map to identify and pick out the appropriate ads. Alternately, individual tables for each individual advertising group can be generated at the central office and sent to the appropriate STBs. In either case, the STB processor having the table examines each advertisement identifier and compares it to its table. If the advertisement identifier matches one contained in its table, the STB would pick out that advertisement and save it. Otherwise, it would ignore the ad.

In another embodiment, the ads delivered on the advertisement channel(s) could be time-division or channel-division multiplexed by advertising group. In time division multiplexing, advertisements corresponding to advertising groups are temporally grouped together when transmitted. The STBs could be instructed to download all advertisements sent on the advertisement channel during particular time periods, those time periods corresponding to the advertising group or groups to which it belongs. In channel division multiplexing, each advertising group is assigned a different advertising channel. The STBs are instructed to download all advertisements sent on the particular advertisement channel(s) to which it corresponds.

In a system such as SDV which operates on an ATM protocol, because the ATM switching occurs at the central office, the central office is able to direct different advertisement channels to one or more of its subscribers' STBs on different VPI/VCIs. In this type of embodiment, one or more advertisement channels corresponding to one or more specific subscribers could be created and sent to the appropriate subscriber(s). Each STB would be instructed to tune to a particular advertisement channel (VPI/VCIs) in order to receive and store all the ads on that particular channel. This type of embodiment is advantageous in that the STBs would not need to filter the ads since each advertisement received on the channel would be appropriate for that STB. In such a system, the central office would typically have its own advertisement server for generating the advertisement channel.

In the case of analog video, the advertisements could be transmitted just as analog video is transmitted over the network and subsequently digitized at the reception point.

Ads can be delivered to the STBs via low, medium or high width channels and in any of a variety of formats such a streaming media, MPEG2, MPEG4, and in various protocols (ATM, IP.

In a simplest embodiment of the invention, the advertisements are inserted in the avails in the channel to which the STB is tuned in the memory address order in which they are listed in the queue. In a more practical embodiment, the ads are displayed in the avails in accordance with an algorithm that takes into account both the order of the ads in the queue and the duration of the avail relative to the duration of the ads identified in the queue such that the duration of the advertisement(s) inserted into the avail match the duration of the avail.

In accordance with a more preferred embodiment of the invention, the set top box maintains multiple queues and executes a viewer determination algorithm for selecting from which queue ARLs will be retrieved based on predetermined criteria. For instance, a different queue may be maintained for each potential television viewer at the subscriber location (e.g., mother, father, child). The algorithm for determining from which queue to retrieve ads could be based on many factors including, the nature of the program to which the set top box is tuned, the time of day, recent channel change or volume control history which might be indicative of the particular viewer. For instance, PCT Publication No. WO 033233A1, entitled "Subscriber Identification System" and assigned to the same assignee as the present invention (corresponding to U.S. patent application Ser. No. 09/452,893, filed on Dec. 2, 1999), the disclosure of which is incorporated herein by reference, discloses a method and apparatus in accordance with this feature for determining the probable identity or at least characteristics of the particular viewer in a subscriber household that is viewing the television.

It will be understood by those of skill in the art that maintaining separate queues is merely an exemplary embodiment and that the invention can be adapted such that there is only one queue, but the ARLs include an additional field that signifies which viewer or type of viewer the advertisement is intended for and that is utilized by the viewer determination algorithm in determining which advertisement will be inserted in a particular avail. It also should be understood by those of skill in the art that the term order is not intended to correspond necessarily to the numerical address order of the ARLs in the queue, but encompasses any ordering algorithm that may be used to retrieve ARLs from the queue. For instance, one ordering scheme that would be particularly useful in households with multiple potential viewers of different demographic characteristics is to assign tags within the ARLs that indicate their order. These tags may be rewritten as the viewer prediction changes (such as by changes in time of day or program being watched).

In accordance with alternative embodiments of the invention, the queue itself need not be stored at the set top box but can be stored at a separate server on the network which communicates with the set top box via the network.

Several methods and apparatus are presently available for recording television programming for viewing at a time other than the time it was originally transmitted. At present, the most common apparatus for doing so is a video cassette recorder. However, other apparatus and methods in which the programming is recorded digitally are becoming more common. Some presently available digital recording systems and services, for instance, are sold under the brand names TiVo☐ and Replay TV☐.

The present invention can readily be applied to recorded programming as long as the recorded program is played back through the STB so that the advertisement insertion module may insert the advertisement.

In fact, the invention can be applied to any information stream regardless of source as long as the information stream passes through the advertisement insertion module. Thus, for instance, the invention is equally applicable to analog cable, regular earth-based broadcast television, the Internet, a readout from any type of memory device, including compact disks, digital video disks, other optical media, magnetic disks, ROM, RAM, etc.

In a preferred embodiment of the invention, the set top box transmits back to the head end or central office information concerning the ads that have been played at that subscriber location. In this manner, the television service provider can then bill the advertiser based on ads that were played.

It should be apparent to those of skill in the art, that the number of particular embodiments of the invention is practically limitless. Technologies for inserting data such as advertisements into other data streams are well known. In accordance with the invention, ads stored in digital format could be readily inserted into digital video streams as well as analog video streams. Further, as previously noted, the invention is not limited to insertion of ads but can apply to any form of data and also is not limited to television but can be used to insert any information into any data stream.

Figure 4:
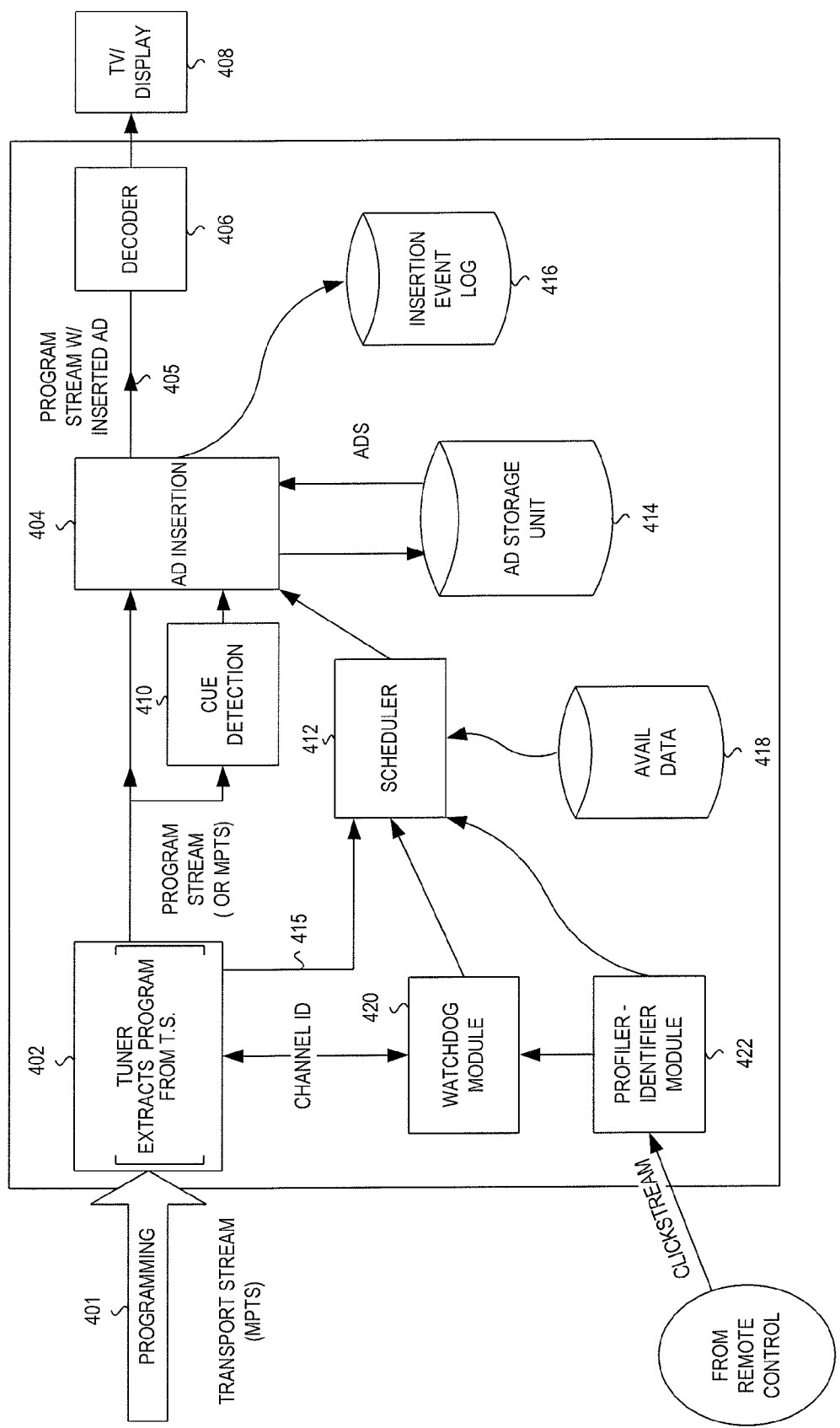
FIG. 4 is a functional block diagram illustrating queue-based advertisement scheduling and advertisement insertion according to one embodiment of the present invention.

FIG. 4 is a functional block diagram illustrating queue-based advertisement scheduling and advertisement insertion according to one embodiment of the present invention. In this example, the received programming stream 401 is in the form of a DVB transport stream, i.e. a multiple program transport stream (MPTS). In the tuner function 402, the channel selected by the subscriber is extracted and demodulated from the MPTS. This channel carries digital queue tones which are detected by a detection module 410. The advertisement to be inserted in the next detected avail has already been queued up (e.g., from the scheduler 412 using the avail data and prioritization or other scheduling algorithm. The advertisement insertion module 404 inserts or splices the queued advertisement according to the queue tone timing. The resulting program stream 405 with the substituted advertisement is decoded by decode module 406 and sent to the television 408 or other display device.

The queue based insertion can be combined with a time/program based set of rules in which case the ad to be presented is determined in part by the time-of-day program being watched or a combination thereof.

In one embodiment, the time-based aspect is addressed by having time dependent queues. As an example, there can be a morning queue, a mid-day queue, an evening (prime-time) queue, and a late night queue. For instance, if it is expected that children are the most likely demographic segment to watch television in the morning, the "morning queue" is designed for children. Similarly, the late night queue may be designed for adults. Having a time dependent queue allows direction of the advertisement at the particular individual that might be watching.

It also is possible to use a system such as described in aforementioned PCT Publication No. WO 033233A1 to determine who is watching the television and organize the queue based at least partially on that criterion. Other methods include the use of personal identification Nos. (PINs) to determine who is viewing the television, or monitoring interaction with an Electronic Program Guide (EPG). By characterizing the household, it is possible to establish the most appropriate queues for each time of day.

Program based rules also may be used in conjunction with the queues to provide a combination of "linked" advertising and advertising in accordance with the concepts of the present invention. Using such a combination, the order of the ARLs may be varied depending upon the program being watched. This allows a particular advertiser to link to a certain program. In one embodiment, the ARL is moved to the top of the queue when a particular program is being watched. In an alternate embodiment, program dependent queues can be created, such that there is a queue for a program like "ER" and a different one for "Survivor".

The scheduler 412 is the ARL retrieval circuit which receives the ARLs and instructions for their organization in the queue and then organizes the queue (not separately shown in FIG. 4) in accordance with the received ARLs and instructions. In this exemplary embodiment, the scheduler retrieves the ARLs from a dedicated control channel 415 in the media stream 401. However, as previously noted, this is just one of many possible transport streams for the ARLs and/or instructions. The scheduler also provides a schedule and notifies the advertisement insertion module 404 of the schedule.

When the queue tone is detected by detection module 410, the advertisement insertion module 404 requests the appropriate advertisement from the advertisement storage unit 414 which then sends the advertisement to the insertion module 404. The advertisement insertion module then inserts the advertisement with the proper timing.

In this exemplary embodiment, the advertisements that are stored into the advertisement storage unit 404 are received over a dedicated advertisement channel in the media stream. For instance, the scheduler 412 may include circuitry for picking out the appropriate advertisements for the particular STB from a continuous stream of advertisements as previously described and writing them to the advertisement storage unit 414.

The watchdog module 420 notifies the scheduler 412 of any changes that may require a queue update or switching among multiple queues as previously described. For instance, a profiler module 422 can process information such as data as to the program being watched and remote control operation such a volume control and channel change control to attempt to determine which particular viewer in a subscriber household is viewing the television in order to choose among the various queues as previously described.

The advertisement insertion module 404 generates and stores an advertisement insertion log 416 of all insertion events. This is essentially the schedule of the ads inserted and whether or not they were inserted successfully and/or displayed. The insertion logs will eventually be sent upstream to the central office to be used for billing advertisers based on the ads that have been played at each subscriber's location.

Since FIG. 4 is functional block diagram, the blocks in FIG. 4 do not necessarily correspond to separate hardware components, such as illustrated in FIG. 2. For exemplary purposes, however, blocks 412, and 416 represent portions of memory and might correspond to any one of more of the memories 210, 212, 214 shown in FIG. 2. Functional blocks 404, 406, 410, 412, 420, and 422 represent processing steps and might correspond to the system control unit 204 and the channel processing circuit 222 shown in FIG. 2. As processing steps, these blocks may correspond to software executed by any form of digital processor in the system control unit. However, any one or more of these functions could be performed by dedicated hardware (e.g., an analog circuit) within the system control unit or separate therefrom. It should be understood that the term circuit as used in this specification is intended to be all-inclusive and to encompass analog circuits and digital circuits, including finite state machines, digital signal processors, computers, central processing units, ASICs, and programmed general purpose processors. Functional block 402 correspond to one or more of tuner block 218, demodulator block 220 and demultiplexer block 224 in FIG. 2.

Advertisement avails can be sold to the advertisers in a number of ways. For instance, in a first scheme illustrated in FIG. 5A termed repetition-based sales, the advertiser, e.g., FORD, pays according to the frequency at which an advertisement is displayed. For example, if an advertiser desires that its advertisement be played every fifth avail (or alternately, every fifth advertisement since avails do not necessarily have a one-to-one correspondence to advertisements), the ARL for that advertisement would be placed in the queue every fifth slot. FIG. 5A illustrates, for exemplary purposes, a FORD advertisement located at a first address resource locator ($ARL_1$), at a sixth address resource locator ($ARL_6$) and at an eleventh address resource locator ($ARL_{11}$). It is not necessary that every fifth advertisement be the same advertisement. For instance, as shown in FIG. 5B, the advertiser may have a serial advertisement campaign and thus every fifth advertisement can be the next advertisement in the series. In FIG. 5B, different FORD advertisements are used, for example, $FORD_1$, $FORD_2$, $FORD_3$.

Figure 6:
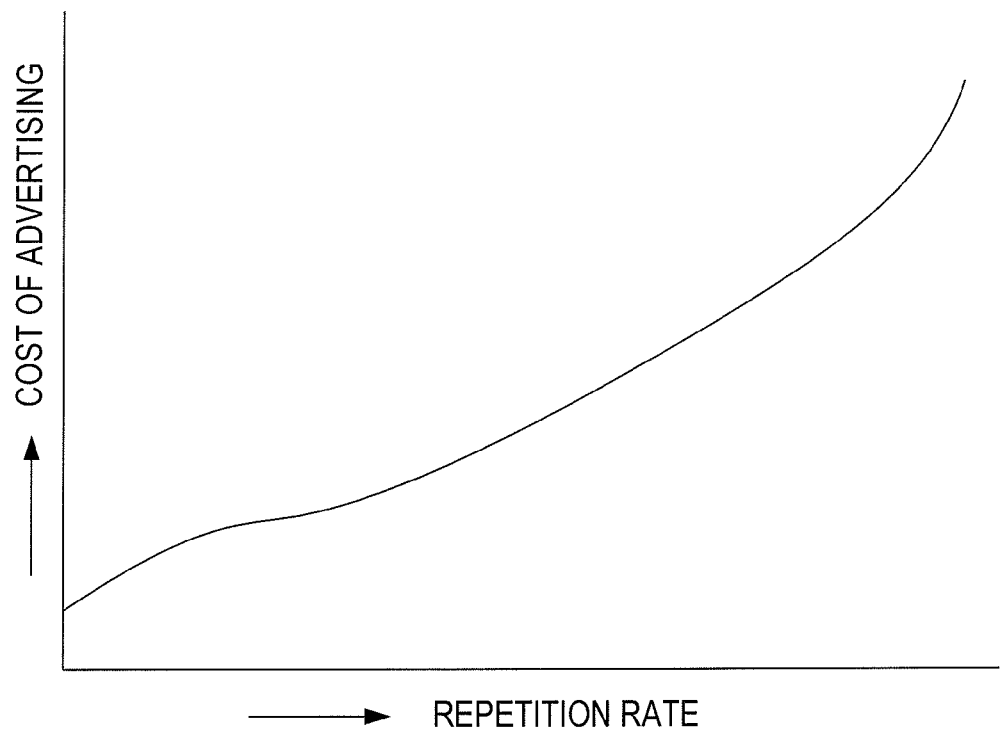
FIG. 6 is a graph illustrating one potential pricing scheme in accordance with the present invention.

Pricing for repetition-based advertisement sales may be arranged such that the more closely spaced the ads are, the higher the price for placing the advertisements. The pricing need not be linear. FIG. 6 is a graph illustrating one potential pricing scheme following such a paradigm. In FIG. 6, for exemplary purposes, the repetition rate is shown on the X axis and the cost of advertising is shown on the Y axis. The cost of advertising is shown to be directly proportional to the repetition rate, i.e., the higher the repetition, the higher the cost of advertising. Further, there is no requirement that the advertisements be spaced evenly. For instance, they may be more closely spaced near the beginning of the advertisement campaign and then reduced in frequency later, herein termed non-linear repetition rate. Also, as already noted, advertisements can be inserted based on entirely other criteria. For instance, it is still possible to set up some or all of the advertisements to be displayed at a particular time of day (as long as the set top box is turned on and tuned to a programming channel).

Another alternative method for sales of advertisement opportunities is herein termed time-based priority queuing. In time-based priority queuing, an advertiser may require that an advertisement be shown at a particular time or within a particular time interval (e.g., prime time).

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A method of selectively inserting different advertisements into a stream of television programming at different addressable nodes of a communications network, said method comprising the steps of:

receiving, a stream of television programming from a head end at a plurality of addressable nodes;

storing advertisements at each of the plurality of addressable nodes of the communications network;

storing in one or more queues advertisement resource locators (ARLs) according to instructions received by the addressable node that designate the order of the ARLs in the queues, each of said ARLs comprising data identifying a location of a corresponding advertisement, wherein each of the queues corresponds to a subset of the plurality of addressable nodes;

determining, at each of the addressable nodes, whether the addressable node is turned on, if the addressable node is turned on the channel that the addressable node is tuned to, and detecting one or more intervals in the stream within which the advertisements may be inserted;

responsive to the determination, retrieving an ARL in the order indicated m the queue from the queue corresponding to the addressable node;

inserting the advertisement corresponding to the retrieved ARL into the detected one or more intervals in the stream at the addressable node; and communicating to a service provider which of the advertisements are stored at the addressable node, which of the advertisements have been played, when the advertisements have been played, and which of the advertisements are scheduled for play.

2. The method of claim 1, wherein the step of communicating includes communicating to the service provider using a network different from the network transmitting, the programming stream.

3. The method of claim 1, wherein if the addressable node is not turned on then the ARL is not retrieved from the queue and not inserted into the determined interval.

4. The method of claim 1, wherein the ARL is retrieved from the queue and inserted into the determined interval in the programming stream that corresponds to the tuned channel.

* * * * *